(12) United States Patent
Hsu

(10) Patent No.: US 10,148,192 B1
(45) Date of Patent: Dec. 4, 2018

(54) POWER SUPPLY SYSTEM AND CONTROL METHOD USING THE SAME

(71) Applicant: Wiwynn Corporation, New Taipei (TW)

(72) Inventor: Kuan-Wei Hsu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 15/963,075

(22) Filed: Apr. 25, 2018

(30) Foreign Application Priority Data

Dec. 8, 2017 (TW) .............................. 106143052 A

(51) Int. Cl.
| | |
|---|---|
| *H02M 1/32* | (2007.01) |
| *H02M 7/21* | (2006.01) |
| *H02M 7/02* | (2006.01) |
| *H02M 7/23* | (2006.01) |
| *H02M 7/217* | (2006.01) |

(52) U.S. Cl.
CPC ............... *H02M 7/02* (2013.01); *H02M 1/32* (2013.01); *H02M 7/2173* (2013.01); *H02M 7/23* (2013.01); *H02M 2001/325* (2013.01)

(58) Field of Classification Search
CPC ............. H02M 1/32; H02M 2001/325; H02M 7/2173; H02M 7/23
See application file for complete search history.

(56) References Cited

U.S. PATENT DOCUMENTS

| | | | | |
|---|---|---|---|---|
| 2007/0195567 | A1* | 8/2007 | Morishita | H02M 7/487 363/55 |
| 2010/0027298 | A1* | 2/2010 | Cohen | H02M 3/33592 363/21.14 |
| 2012/0170343 | A1* | 7/2012 | Takahashi | H02M 7/48 363/147 |

FOREIGN PATENT DOCUMENTS

| | | |
|---|---|---|
| TW | 200908510 | 2/2009 |
| TW | 201624867 A | 7/2016 |

* cited by examiner

*Primary Examiner* — Timothy J Dole
*Assistant Examiner* — Ishrat Jamali
(74) *Attorney, Agent, or Firm* — Winston Hsu

(57) ABSTRACT

A power supply system is disclosed. The power supply module comprises a three-phase voltage source, for generating a power source with three phases; a plurality of power supply modules, coupled to the three-phase voltage source, each comprising a plurality of major transforming modules corresponding to the three-phase voltage source for generating a plurality of direct-current voltages according to the three-phase voltage source; and at least a backup supply module, coupled to the plurality of power supply modules, each comprising a plurality of backup transforming modules corresponding to the three-phase voltage source, for generating the plurality of direct-current voltages corresponding to the three-phase voltage source by a backup transforming module corresponding to at least one of the plurality of major transforming modules of the plurality of power supply modules when the at least one of the plurality of major transforming modules is in an abnormal operation.

10 Claims, 3 Drawing Sheets

POWER SUPPLY SYSTEM AND CONTROL METHOD USING THE SAME

BACKGROUND OF THE INVENTION

1. Field of the Invention

The present invention relates to a power supply system and a control method using the same, and more particularly, to a power supply system and a control method capable of providing stable three-phase voltage sources.

2. Description of the Prior Art

With the advancement and development of technology, demands of big data analysis, artificial intelligence (AI) or so are increasing, which need a large amount of computing servers and significant power supplies. For a data center, which needs megawatts (MW) power, the stability of a power supply system is extremely important. A conventional power supply applied for a chassis inside a computer system is mainly implemented with a structure of a single-phase module or a three-phase module. The single-phase module takes a power factor correct (PFC) and a direct-current/direct-current (DC/DC) as the single module for utilization. However, when the PFC or the DC/DC of the single module is broken, the power cannot be supplied to the computer system. And, since a conventional server rack consumes kilowatts (KW) power, when an input current is excessive, the single module cannot afford and would result in damage. In the meanwhile, the power is deployed with massive amount of copper lines, which increases the manufacturing cost. The three-phase module takes a three-phase voltage source as the input current, and utilizes three sets of PFCs and DC/DC modules. However, when the PFC and DC/DC of any phase module is broken or malfunctioned, the three-phase module cannot work normally because of imbalance phase, and even more, a blackout of current protection might be triggered and burns down coils of the power plant.

Therefore, how to provide a power supply system with a stable output DC voltage source to solve the problems mentioned above has become one of objectives in the industry.

SUMMARY OF THE INVENTION

Therefore, the present invention provides a power supply system and a control method thereof, so as to provide stable DC voltage sources.

An embodiment of the present invention discloses a power supply system, comprising a three-phase voltage source, for generating a power source with three phases; a plurality of power supply modules, coupled to the three-phase voltage source, each comprising a plurality of major transforming modules corresponding to the three-phase voltage source for generating a plurality of direct-current voltages according to the three-phase voltage source; and at least a backup supply module, coupled to the plurality of power supply modules, each comprising a plurality of backup transforming modules corresponding to the three-phase voltage source, for generating the plurality of direct-current voltages corresponding to the three-phase voltage source by a backup transforming module corresponding to at least one of the plurality of major transforming modules of the plurality of power supply modules when the at least one of the plurality of major transforming modules is in an abnormal operation.

An embodiment of the present invention discloses a control method, for a power supply system, wherein the power supply system includes a three-phase voltage source, a plurality of power supply modules and at least a backup supply module, a plurality of logic control circuits and a driving circuit, the control method comprising the plurality of logic control circuits determining whether each of a plurality of major transforming modules of the plurality of power supply modules works normally or not, according to a working signal of the each of the plurality of major transforming modules of the plurality of power supply modules; the logic control circuit turning off one of the plurality of major transforming modules of the plurality of power supply modules in the abnormal operation, when the working signal of one of the plurality of major transforming modules of the plurality of power supply modules is in an abnormal operation; and the driving circuit generating a driving signal according to the working signal of one of the plurality of major transforming modules of the plurality of power supply modules in the abnormal operation, so as to drive a backup transforming module of the at least a backup supply module corresponding to one of the plurality of major transforming modules in the abnormal operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
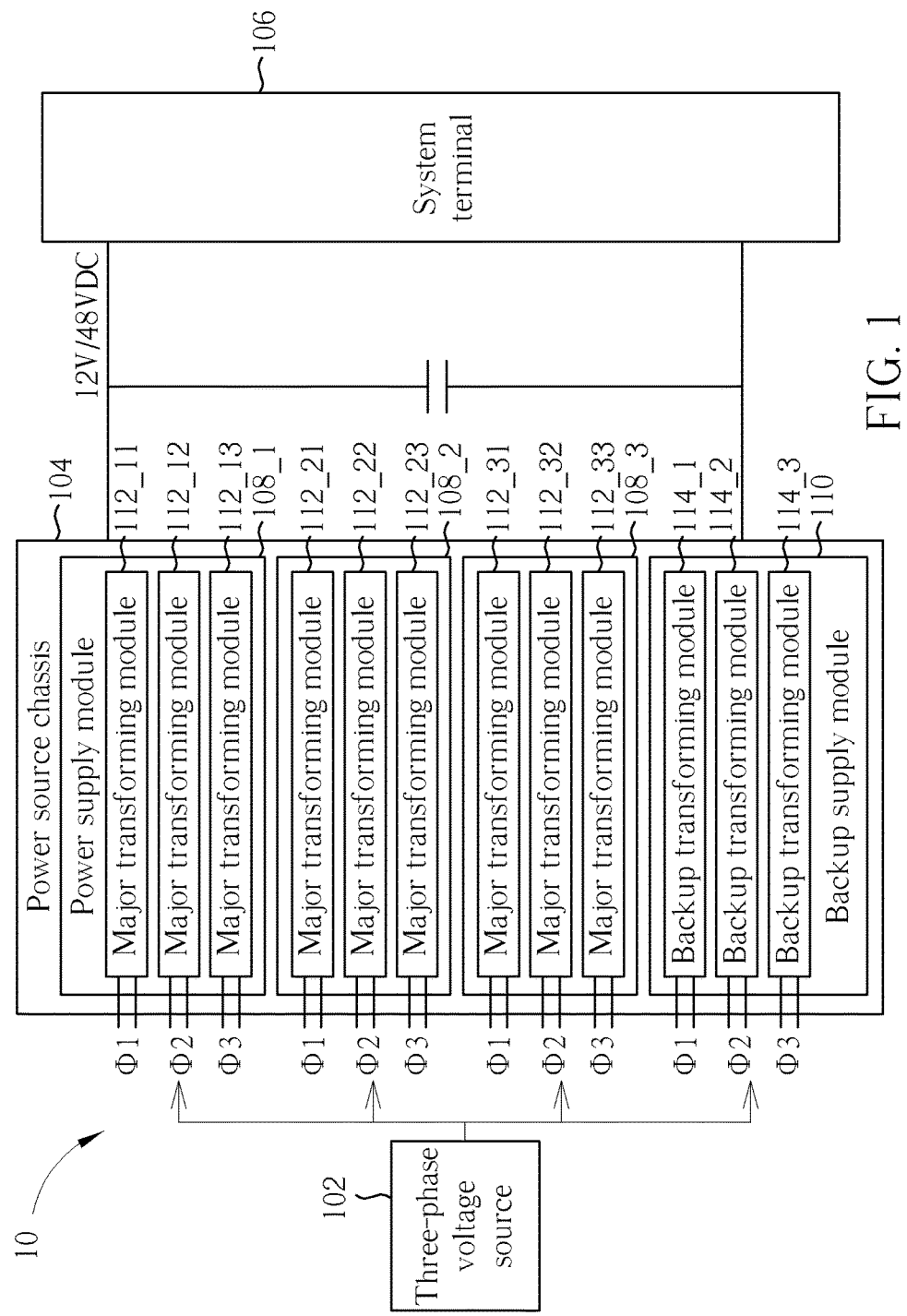
FIG. 1 is a schematic diagram of a power supply system according to an embodiment of the present invention.

Please refer to FIG. 1, which is a schematic diagram of a power supply system 10 according to an embodiment of the present invention. The power supply system 10 includes a three-phase voltage source 102 and a power source chassis 104, and supplies a stable direct-current (DC) output voltage to a system terminal 106, wherein the system terminal 106 may be a server, a computer system or so, and not limited thereto. The three-phase voltage source 102 may be a three-phase alternative-current (AC) voltage source, such as a 380V or 220V three-phase AC voltage source, and the power source chassis 104 may transform the voltage source provided by the three-phase voltage source 102 into DC/DC voltage sources and then provided to the system terminal 106. In an embodiment, after the transformation of the power source chassis 104, the power supply system 10 outputs 12V/48V DC/DC voltage sources to the system terminal 106.

In detail, the power source chassis 104 of the power supply system 10 includes a plurality of power supply modules 108_1, 108_2, 108_3 and at least a backup supply module 110, wherein each of the power supply modules 108_1, 108_2, 108_3 includes a plurality of major transforming modules 112 corresponding to the three-phase voltage source 102, for generating a plurality of DC voltages according to the three-phase voltage source 102. In this embodiment, each of the power supply modules 108 includes three major transforming modules 112 to respectively transform phases Ø1, Ø2, Ø3 of the three-phase voltage source 102 into corresponding DC voltages. That is, the power supply module 108_1 includes the major transforming modules 112_11, 112_12, 112_13 for generating the DC voltages corresponding to the phases Ø1, Ø2, Ø3 of the three-phase voltage source 102, the power supply module 108_2 includes the major transforming modules 112_21, 112_22, 112_23 for generating the DC voltages corresponding to the phases Ø1, Ø2, Ø3 of the three-phase voltage source 102, and the power supply module 108_3 includes the major transforming modules 112_31, 112_32, 112_33 for generating the DC voltages corresponding to the phases Ø1, Ø2, Ø3 of the three-phase voltage source 102. Each backup supply module 110 includes a plurality of backup transforming modules 114_1, 114_2, 114_3 corresponding the three-phase voltage sources of the three-phase voltage source 102, for generating the corresponding DC voltage according to the three-phase voltage source 102 by the backup transforming module 114 corresponding to at least one of the major transforming modules 112 of any of the power supply modules 108_1, 108_2, 108_3, when the at least one of the major transforming modules 112 is in an abnormal operation. For example, when the major transforming module 112_11 of the power supply module 108_1 is in the abnormal operation, since the major transforming module 112_11 is utilized for transforming the voltage source corresponding to the phase Ø1 of the three-phase voltage source 102, the power supply system 10 generates the corresponding DC voltage according to the phase Ø1 of the three-phase voltage source 102 by the backup transforming module 114_1 corresponding to the major transforming module 112_11 which is in the abnormal operation; that is, the backup transforming module 114_1 replaces the major transforming module 112_11 to perform the voltage transforming. Notably, all of the major transforming modules 112 of each of the power supply modules 108 are connected in parallel, and all of the backup transforming modules 114 of the backup supply module 110 are also connected in parallel. As such, when any of the major transforming modules 112 of the power supply module 108 of the power supply system 10 is abnormal or malfunction, the backup transforming module 114 provides the DC voltage corresponding to the major transforming module 112, which is in the abnormal operation or malfunctioned, so as to maintain a stable output current of the power supply system 10 to the system terminal 106.

The embodiment stated above briefly illustrates that the power supply system 10 of the present invention stabilizes the output DC voltage of the power supply system 10 by the backup transforming modules 114 when the major transforming modules 112 are abnormal or malfunctioned. Notably, those skilled in the art may make proper modifications to the power supply system 10 according to different system requirements. For example, multiple backup supply modules 110 may be deployed in a single power supply system 10, or multiple backup transforming modules 114 may be deployed in a single backup supply module 110, so as to assure a stability of the power supply system 10, or an amount of the backup transforming module 114 may be properly adjusted according to different voltage source, but not limited thereto, and all belong to the scope of the present invention.

Figure 2:
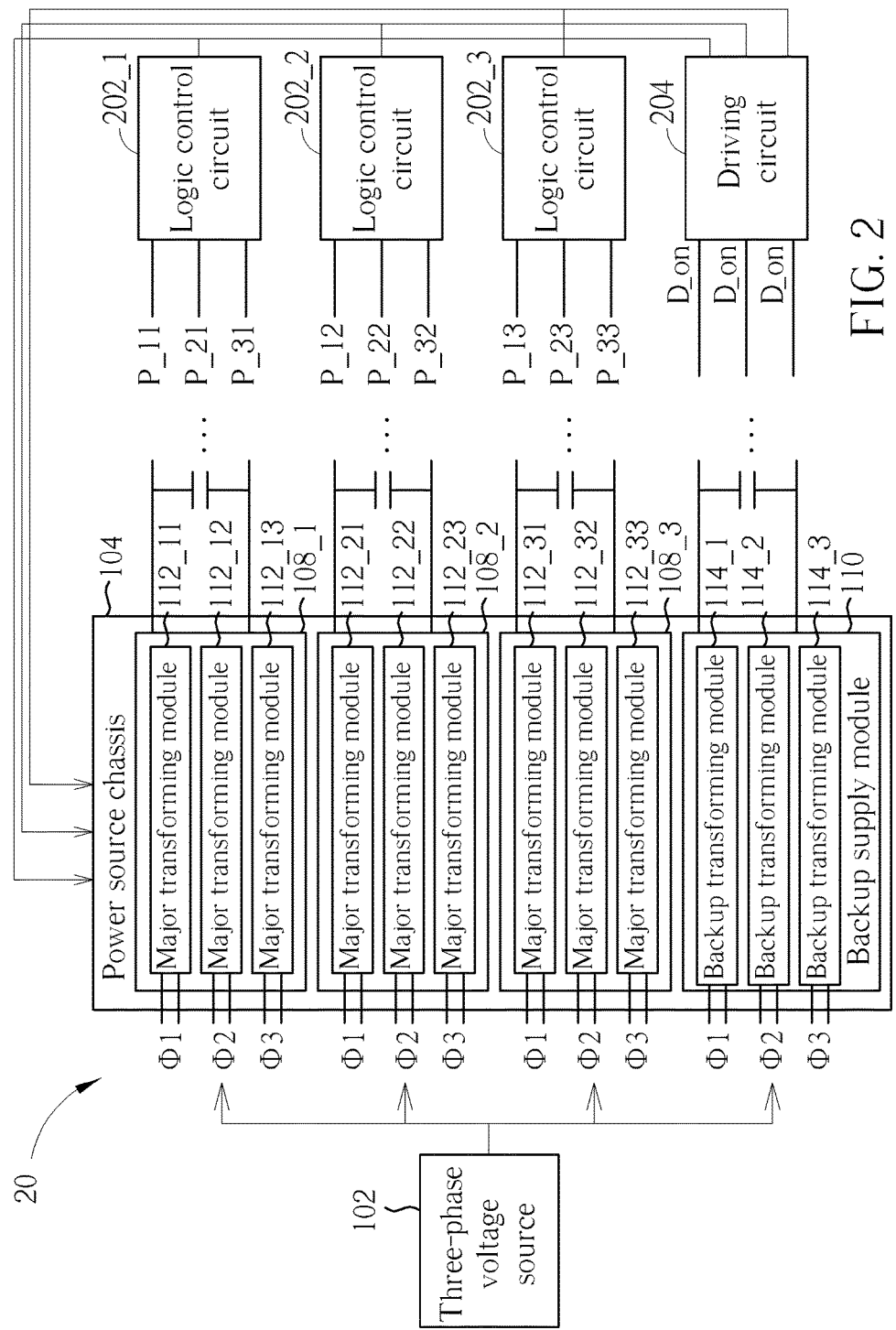
FIG. 2 is a schematic diagram of another power supply system according to an embodiment of the present invention.

In detail, please refer to FIG. 2, which is a schematic diagram of a power supply system 20 according to an embodiment of the present invention. Different with the power supply system 10, the power supply system 20 further includes a plurality of logic control circuits 202_1, 202_2, 202_3 and a driving circuit 204. The logic control circuits 202_1, 202_2, 202_3 are respectively coupled to each of the major transforming modules 112 of the power supply module 108, so as to determine whether the major transforming modules 112 work normally or not according to a working signal P of each of the major transforming modules 112 corresponding to the power supply module 108. The driving circuit 204 drives the backup transforming module 114 corresponding to the major transforming module 112, which is in the abnormal operation, according to the working signal P corresponding to each of the major transforming modules 112 when at least one of the major transforming modules 112 is in the abnormal operation.

In other words, the logic control circuit 202_1 is connected to the major transforming modules 112_11, 112_21, 112_31, and determines whether the major transforming modules 112_11, 112_21, 112_31 operate normally or not, according to the working signals P_11, P_21, P_31; the logic control circuit 202_2 is connected to the major transforming modules 112_12, 112_22, 112_32, and determines whether the major transforming modules 112_12, 112_22, 112_32 operate normally or not, according to the working signals P_12, P_22, P_32; and the logic control circuit 202_3 is connected to the major transforming modules 112_13, 112_23, 112_33, and determines whether the major transforming modules 112_13, 112_23, 112_33 operate normally or not, according to the working signals P_13, P_23, P_33. For example, when the logic control circuit 202_1 detects the working signal P_11 of the major transforming module 112_11 is in the abnormal operation, the logic control circuit 202_1 turns off the major transforming module 112_11, and the driving circuit 204 correspondingly generates a driving signal D_on according to the working signal P_11 to drive the backup transforming module 114_1 corresponding to the major transforming module 112_11, so as to provide the output DC voltage corresponding to the phase Ø1 of the three-phase voltage source 102, such that the power supply system 20 may provide the stable voltage source. Similarly, when the logic control circuit 202_2 detects the working signal P_32 of the major transforming module 112_32 is in the abnormal operation, the logic control circuit 202_2 turns off the major transforming module 112_32, and the driving circuit 204 correspondingly generates the driving signal D_on according to the working signal P_32 to drive the backup transforming module 114_2 corresponding to the major transforming module 112_32, so as to provide the output DC voltage corresponding to the phase Ø2 of the three-phase power source 102, such that the power supply system 20 may provide the stable voltage source. Notably, an amount of the backup transforming module 114 for replacing the major transforming module 112, which is in the abnormal operation, is not limited to one. If more than one major transforming module 112 performs abnormally, the logic control circuits 202 simultaneously drive a corresponding amount of the backup transforming module 114, so as to provide the stable output DC voltage.

Figure 3:
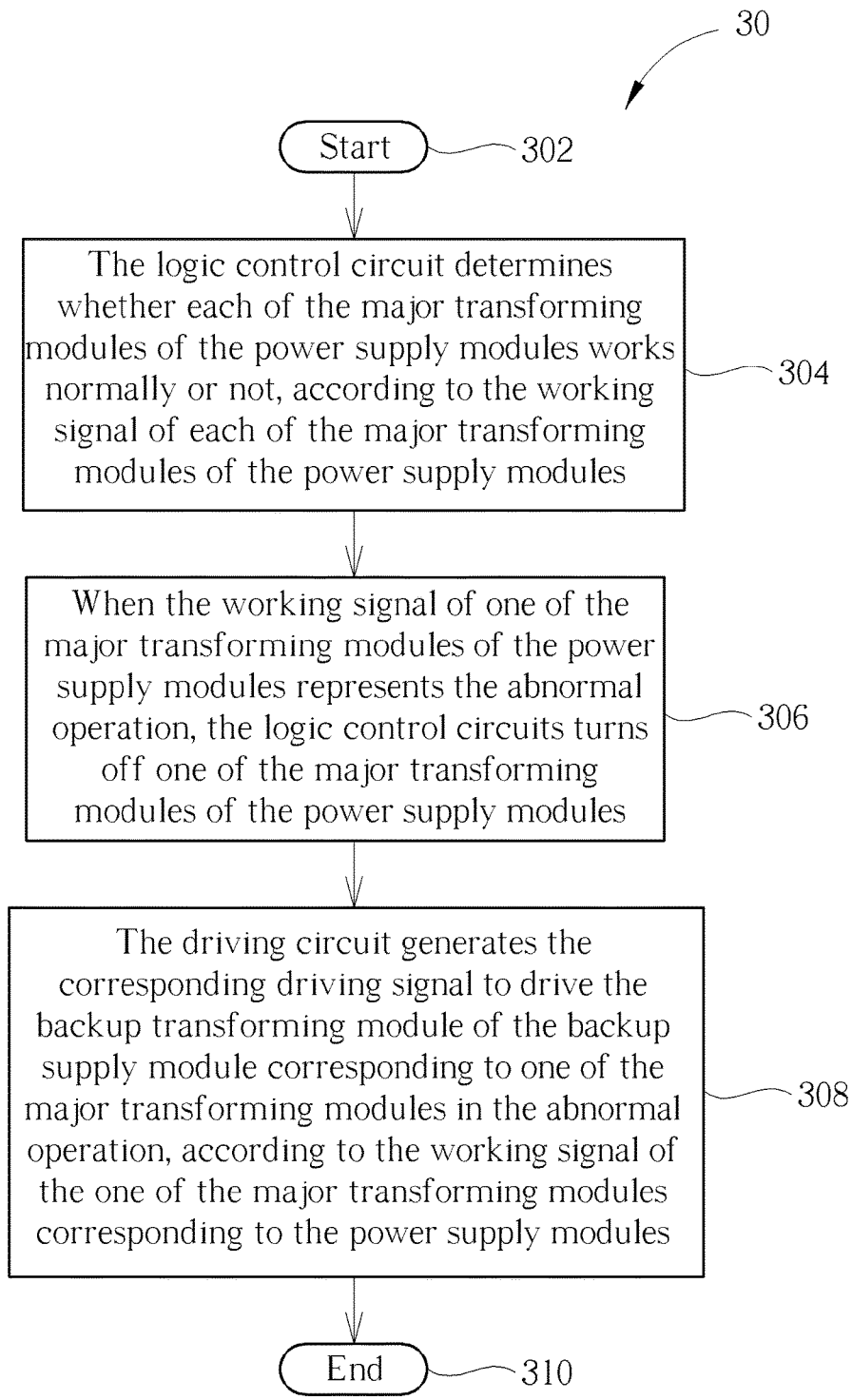
FIG. 3 is a schematic diagram of a control method according to an embodiment of the present invention.

When each of the major transforming modules 112 of the power supply system 20 works normally, the backup supply module 110 is in a standby state. Therefore, when any of the major transforming modules 112 of the power supply system 20 performs abnormally, the power supply system 20 turns on the backup transforming module 114 of the backup supply module 110 to maintain the stable output DC voltage of the power supply system 20. As to an operation method of driving the backup supply module 110 to transform the voltages, when the major transforming modules 112 of the power supply system 20 are in the abnormal operation, please refer to FIG. 3, which is a schematic diagram of a control method 30 according to an embodiment of the present invention. The control method 30 includes the following steps:

Step 302: Start.

Step 304: The logic control circuit 202 determines whether each of the major transforming modules 112 of the power supply modules 108 works normally or not, according to the working signal P of each of the major transforming modules 112 of the power supply modules 108.

Step 306: When the working signal P of one of the major transforming modules 112 of the power supply modules 108 represents the abnormal operation, the logic control circuits 202 turns off one of the major transforming modules 112 of the power supply modules 108.

Step 308: The driving circuit 204 generates the corresponding driving signal D_on to drive the backup transforming module 114 of the backup supply module 110 corresponding to one of the major transforming modules 112 in the abnormal operation, according to the working signal P of the one of the major transforming modules 112 corresponding to the power supply modules 108.

Step 310: End.

As can be known from the above, according to the control method 30, the power supply system 20 detects and determines the working signal of the major transforming modules 112 by the logic control circuits 202, such that the driving circuit 204 wakes up the backup transforming module 114 of the backup supply module 110 in the standby state when any of the major transforming modules 112 is in the abnormal operation, and a balance state of the power supply system 20 is maintained. In an embodiment, take the transformation of each of the major transforming modules 112_11, 112_21, 112_31 corresponding to the phase Ø1 of the three-phase voltage source 102 detected by the logic control circuits 202 for an example. In step 304, the logic control circuits 202 determines whether each of the major transforming modules 112_11, 112_21, 112_31 works normally or not according to the working signals P_11, P_21, P_31. In this embodiment, assume that the major transforming module 112_11 is in the abnormal operation, and generates the working signal P_11 of the abnormal operation, the logic control circuit 202_1 turns off the major transforming module 112_11 (step 306). Then, in step 308, the driving circuit 204 generates the corresponding driving signal D_on to drive the backup transforming module 114_1 of the backup supply module 110 corresponding to the major transforming module 112_11, according to the working signal P_11 of the abnormal operation corresponding to the major transforming module 112_11, so as to provide the output DC voltage corresponding to the phase Ø1 of the three-phase voltage source 102, and maintain a three-phase balance of the three-phase voltage source 102.

Notably, the transformation example of the major transforming module 112_11 corresponding to the phase Ø1 of the three-phase power source 102 above is to explain the control method 30, but not limited thereto. Similarly, when other major transforming modules corresponding to the phases of the three-phase voltage source 102 are in the abnormal operation, the control method 30 may be applied and utilized for driving the backup supply module 110, so as to assure that a good power quality of the power supply system 20 is maintained. In addition, when the major transforming module 112 of the power supply system 20 in the abnormal operation is repaired and reverted to the normal operation state, the corresponding logic control circuit 202 turns off the backup supply module 114, and the stable operation of the power supply system is maintained.

In summary, the power supply system of the present invention provides the stable output DC voltage by the backup supply module, and assures the good power quality. Notably, the embodiments mentioned above are utilized for illustrating the idea of the present invention, those skilled in the art may make proper modifications, and not limited thereto. For example, the amount of the backup supply module is not limited to one; the logic control circuits and the driving circuit may be implemented in the same circuit, which can be modified according to a structure of computer systems or demands, and all belong to the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply system, comprising:
a three-phase voltage source, for generating a power source with three phases;
a plurality of power supply modules, coupled to the three-phase voltage source, each comprising a plurality of major transforming modules corresponding to the three-phase voltage source for generating a plurality of direct-current voltages according to the three-phase voltage source;
at least a backup supply module, coupled to the plurality of power supply modules, each comprising a plurality of backup transforming modules corresponding to the three-phase voltage source, for generating the plurality of direct-current voltages corresponding to the three-phase voltage source by a backup transforming module corresponding to at least one of the plurality of major transforming modules of the plurality of power supply modules when the at least one of the plurality of major transforming modules is in an abnormal operation;
a plurality of logic control circuits, respectively coupled to each of the plurality of major transforming modules of the plurality of power supply modules, for determining whether the plurality of major transforming modules work normally or not according to a working signal of each of the plurality of major transforming modules; and
a driving circuit, coupled to the plurality of power supply modules and the plurality of logic control circuits, for driving the backup transforming module of the at least a backup supply module corresponding to the at least one of the plurality of major transforming modules according to the working signal corresponding to each of the plurality of major transforming modules, when the at least one of the plurality of major transforming modules is in the abnormal operation.

2. The power supply system of claim 1, wherein when the working signal of one of the plurality of major transforming modules of the plurality of power supply modules is in the abnormal operation, the logic control circuit turns off one of the plurality of major transforming modules in the abnormal operation.

3. The power supply system of claim 1, wherein all of the plurality of major transforming modules of each of the plurality of power supply modules are connected in parallel, and all of the plurality of backup transforming modules of the at least a backup supply module are connected in parallel.

4. The power supply system of claim 1, wherein when the plurality of major transforming modules of the plurality of power supply modules are in a normal operation, the at least a backup supply module is in a standby state.

5. A control method, for a power supply system, wherein the power supply system includes a three-phase voltage source, a plurality of power supply modules and at least a backup supply module, a plurality of logic control circuits and a driving circuit, the control method comprising:

the plurality of logic control circuits determining whether each of a plurality of major transforming modules of the plurality of power supply modules works normally or not, according to a working signal of the each of the plurality of major transforming modules of the plurality of power supply modules;

the logic control circuit turning off one of the plurality of major transforming modules of the plurality of power supply modules in the abnormal operation, when the working signal of one of the plurality of major transforming modules of the plurality of power supply modules is in an abnormal operation; and the driving circuit generating a driving signal according to the working signal of one of the plurality of major transforming modules of the plurality of power supply modules in the abnormal operation, so as to drive a backup transforming module of the at least a backup supply module corresponding to one of the plurality of major transforming modules in the abnormal operation.

6. The control method of claim 5, wherein the plurality of power supply modules are coupled to the three-phase voltage source, and each of the plurality of power supply modules comprises the plurality of major transforming modules corresponding to the three-phase voltage source, for generating a plurality of direct-current voltages according to the three-phase voltage source.

7. The control method of claim 5, wherein the at least a backup supply module is coupled to the plurality of power supply modules, and each of the plurality of power supply modules comprises a plurality of backup transforming modules corresponding to the three-phase voltage source, for generating the plurality of direct-current voltages corresponding to the three-phase voltage source by a backup transforming module corresponding to at least one of the plurality of major transforming modules of the plurality of power supply modules, when the at least one of the plurality of major transforming modules is in an abnormal operation.

8. The control method of claim 5, wherein the plurality of logic control circuits are respectively coupled to each of the major transforming modules of the plurality of power supply modules, for determining whether the plurality of major transforming modules work normally or not according to the working signal of each of the plurality of major transforming modules.

9. The control method of claim 5, wherein all of the plurality of major transforming modules of each of the plurality of power supply modules are connected in parallel, and all of the plurality of backup transforming modules of the at least a backup supply module are connected in parallel.

10. The control method of claim 5, wherein when the plurality of major transforming modules of the plurality of power supply modules are in a normal operation, the at least a backup supply module is in a standby state.

* * * * *